W. H. OLDFIELD.
TRAP.
APPLICATION FILED NOV. 19, 1913.
1,153,247.
Patented Sept. 14, 1915.
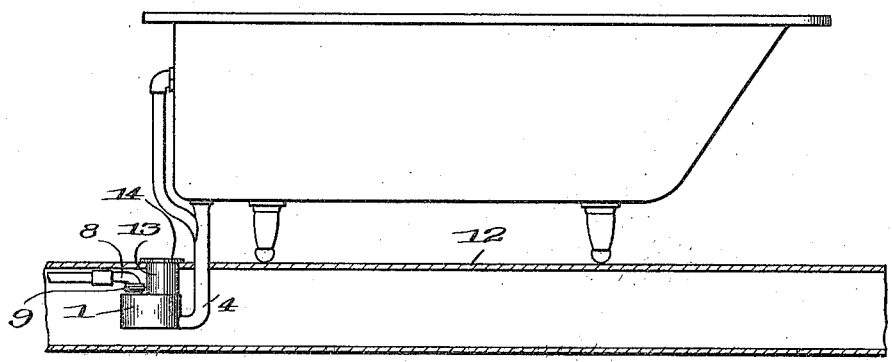
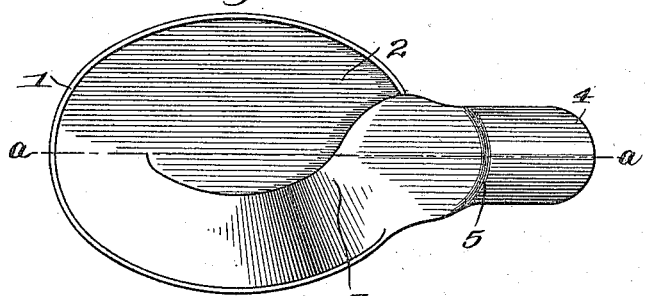
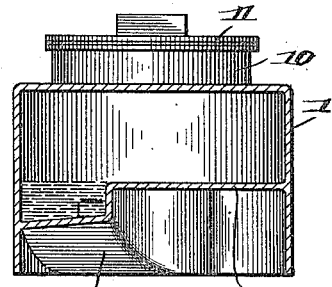
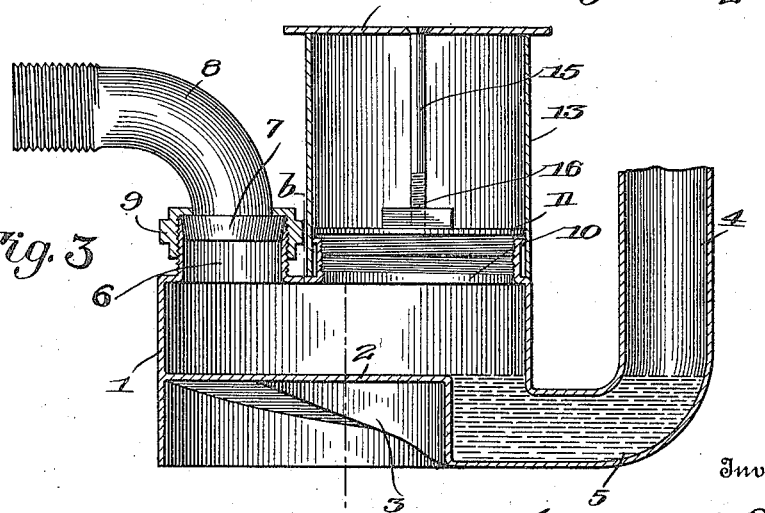

UNITED STATES PATENT OFFICE.

WILLIAM H. OLDFIELD, OF ROCHESTER, NEW YORK.

TRAP.

1,153,247. Specification of Letters Patent. Patented Sept. 14, 1915.

Application filed November 19, 1913. Serial No. 801,814.

*To all whom it may concern:*

Be it known that I, WILLIAM H. OLD-FIELD, of Rochester, in the county of Monroe and State of New York, have invented a new and useful Improvement in Traps, which improvement is fully set forth in the following specification and shown in the accompanying drawings.

The present invention relates to traps and an object of the same is to provide a construction in which no interior ledges or projections are provided for the collection of solid matter, the trap being so constructed that it has small vertical height in order that it may be conveniently located beneath the floor, provision being made whereby the trap may be readily cleaned.

To these and other ends the invention consists in certain parts and combinations of parts all of which will be hereinafter described, the novel features being pointed out in the appended claims.

In the drawings: Figure 1 shows the improved trap arranged beneath the floor and connected to the bath tub; Fig. 2 is a bottom view of the trap; Fig. 3 is a section on the line *a—a*, Fig. 2; and Fig. 4 is a section on the line *b—b*, Fig. 3.

Referring more particularly to the drawings, 1 indicates the body which is preferably elongated horizontally and elliptical in horizontal cross section, its height being much less than its width. The main portion 2 of the bottom of the trap is flat and, extending from one end of the body to the other end, is a curved depressed portion or channel 3, the bottom of which gradually inclines upwardly from one side of the body to the other, the upper end of the inclined portion merging into the flat bottom 2 at the end of the elongated body opposite the deepest portion. At the lowermost end of the depressed portion, an inlet 4 is connected by means of a bend 5 which is below the flat bottom 2 but substantially in horizontal alinement with the lowermost portion of the depressed portion 3. The inlet thus connects with the elongated body substantially in the direction of the longitudinal axis of the latter below the flat bottom and at one end of the body.

The outlet opening 6 is preferably formed in the top of the body at the end or side opposite the inlet and directly over the most shallow portion of the curved depressed portion 3. In this instance, the outlet embodies a collar 6 forming the outlet opening and externally threaded, receiving in its upper end the tapered portion 7 of an elbow 8, the tapered portion being held firmly to the outlet collar 6 by a clamping ring 9 which engages the tapered portion 7 and the externally threaded portion of the collar 6 to draw the parts together.

Owing to the fact that the trap body is elongated horizontally, it is possible to provide a clean out opening in the top thereof nearly as wide as the trap body, and to this end, the top of the body is provided with an opening 10 located to one side of the outlet 6 and over the deepest portion of a depressed bottom of the trap. This clean out opening 10 may be closed by a plug 11. As the clean out is in the top of the trap, the latter is adapted to be arranged below the floor 12 of a bathroom as shown in Fig. 1, and in order to provide a closed passageway from the flooring 12 to the trap body, an open-ended sleeve is snugly fitted about the clean-out opening sleeve 10 and rests on the top of the trap, its upper end projecting through the opening in the flooring 12 and being adapted to be closed by a closure member 14 which may be held in place by a bolt or tie piece 15 engaging the closure 14 at its upper end and having screw threads 16 at its lower end for engagement within an opening in the clean-out plug 11.

A trap constructed in accordance with this invention cannot be siphoned. The liquid passes from the inlet 4 through the bend 5 into the side of the deepest portion of a curved channel which extends to the opposite end of the body and gradually decreases in depth. This manner of delivering the liquid into the body causes the liquid to be given a spiral or whirling motion about a vertical axis, the liquid finally passing out of the top of the trap body at a point directly over the shallow portion of the curved channel or depression in the bottom of the trap. This arrangement of the inlet and outlet at opposite sides of the body with the curved depression or channel extending between them effectively breaks the siphoning action, and this breaking is materially assisted by the horizontal elongation or oval shape of the trap body. The clean-out is arranged in the top of the trap and is of a maximum size so that the trap may be located beneath the flooring, thus making the trap especially useful as a bath trap. The short vertical length of the trap also adapts the trap for use with bath tubs, while preventing air binding within the trap body.

Another feature of this invention is the position of the clean out opening in the top of an elongated trap body of the antisiphon type and to one side of the outlet in such a manner that, when the trap body is filled, the clean out will be sealed with relation to the outlet, so that, in the event that the clean out starts to leak, the sewer gas will not pass from the outlet to and through the clean out opening. This feature is especially advantageous in bath traps to be located below the floor as the clean out must be in the top of the trap body.

What I claim as my invention and desire to secure by Letters Patent is:

1. An anti-siphon trap comprising a horizontally-elongated body having an elevated floor along one side and a sunken curved and upwardly inclined portion along the opposite side, said body having, also, an inlet at one end connecting with the low part of said sunken portion, and an outlet at the opposite end leading from the top of the body.

2. An anti-siphon trap comprising a horizontally-elongated body having an inlet and outlet at opposite portions, said body having a curved or sunken portion along one of its sides inclined from one end upwardly in the direction of the length of the body and merging into the bottom of the body at the opposite portion and adapted to impart a whirling action to the liquid passing through the trap, said inlet connecting with the low part of the sunken portion and said outlet leading from the top wall of the body above the high part of the sunken portion.

3. An anti-siphon trap comprising a body having an elliptical horizontal cross section and provided with a substantially horizontal curved depressed portion extending from one end thereof to the other and also gradually decreasing in depth from one end to the other, an inlet connecting with the side of the depressed portion where the latter is deepest, and an outlet extending from the top wall of the trap over the shallow end of said depressed portion.

4. An anti-siphon trap comprising a horizontally-elongated body having an inlet and outlet at opposite portions, said body having a curved or sunken portion along one of its sides inclined from one end upwardly in the direction of the length of the body and merging into the bottom of the body at the opposite portion and adapted to impart a whirling action to the liquid passing through the trap, said inlet connecting with the low part of the sunken portion and said outlet leading from the top wall of the body above the high part of the sunken portion, said body having, also, a clean-out opening in its top over the inlet end, and a removable closure for the clean-out opening.

5. An anti-siphon trap comprising a body of less vertical height than horizontal length having an inlet and an outlet at opposite ends, one leading into the lower portion of the body and the other leading from the top wall of the body, said body having a curved or sunken portion along one of its sides inclined from one end upwardly in the direction of the length of the body and merging into the bottom of the body at the opposite end and adapted to impart a whirling action to the liquid passing through the trap, said body having a clean-out opening in its top over the inlet end, a removable closure for the clean-out opening, an open-ended sleeve mounted on the body and inclosing the clean-out closure, and means removably securing the sleeve in position.

WILLIAM H. OLDFIELD.

Witnesses:
H. H. SIMONS,
ADA M. WHITMORE.

Copies of this patent may be obtained for five cents each, by addressing the "Commissioner of Patents, Washington, D. C."